United States Patent
Wang et al.

(10) Patent No.: US 9,733,412 B2
(45) Date of Patent: Aug. 15, 2017

(54) LIGHT GUIDE AND LIGHTING DEVICE WITH PARALLEL LIGHT SOURCE

(71) Applicants: BOE TECHNOLOGY GROUP CO., LTD., Beijing (CN); BOE OPTICAL SCIENCE AND TECHNOLOGY CO., LTD., Suzhou (CN)

(72) Inventors: Hongyun Wang, Beijing (CN); Feng Zhou, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 1 day.

(21) Appl. No.: 14/445,654

(22) Filed: Jul. 29, 2014

(65) Prior Publication Data

US 2015/0241620 A1   Aug. 27, 2015

(30) Foreign Application Priority Data

Feb. 24, 2014   (CN) .......................... 2014 1 0062607

(51) Int. Cl.
*F21V 7/00*   (2006.01)
*F21V 8/00*   (2006.01)
(Continued)

(52) U.S. Cl.
CPC ............ *G02B 6/0045* (2013.01); *G02B 3/08* (2013.01); *G02B 6/0018* (2013.01); *G02B 1/045* (2013.01); *G02B 6/0048* (2013.01)

(58) Field of Classification Search
CPC .. G02B 6/0036; G02B 6/0038; G02B 6/0045; G02B 6/0046; G02B 6/0048; G02B 6/0061; G02B 3/08
See application file for complete search history.

(56) References Cited

U.S. PATENT DOCUMENTS 6,097,549 A * 8/2000 Jenkins .................. B60Q 1/302
                                                        359/726
7,160,010 B1 * 1/2007 Chinniah .............. F21S 48/215
                                                        362/511

(Continued)

FOREIGN PATENT DOCUMENTS

CN       102062355 A     5/2011
JP       2008034124 A    2/2008

OTHER PUBLICATIONS

1st Office Action issued in Chinese application No. 201410062607.2 issued Jul. 30, 2015.

*Primary Examiner* — Alexander Garlen
(74) *Attorney, Agent, or Firm* — Nath Goldberg Meyer; Joshua B. Goldberg

(57) ABSTRACT

The present invention discloses a light guide and a lighting device with parallel light source. The light guide comprises a body with a light incident side and a light emergent side. The body comprises: a light incident surface; light emergent surfaces; and a light guide surface group provided with a plurality of light guide surfaces and used for guiding at least a part of the rays of light guided into the body via the light incident surface by total reflection, and determine out-emitting positions of the part of the light rays guided by total reflection by the light guide surface group, on the light emergent surfaces, so that the body is formed with bright areas with guided-out rays of light and dark areas without guided-out rays of light on the light emergent surfaces.

20 Claims, 5 Drawing Sheets

(51) Int. Cl.
*G02B 3/08* (2006.01)
*G02B 1/04* (2006.01)

(56) References Cited

U.S. PATENT DOCUMENTS

| | | | |
|---|---|---|---|
| 2004/0027833 A1* | 2/2004 | Amano | F21S 48/215 |
| | | | 362/507 |
| 2004/0096182 A1 | 5/2004 | Yamashita et al. | |
| 2005/0286251 A1 | 12/2005 | Smith | |
| 2012/0313534 A1* | 12/2012 | Urtiga | F21V 5/045 |
| | | | 315/158 |

* cited by examiner

LIGHT GUIDE AND LIGHTING DEVICE WITH PARALLEL LIGHT SOURCE

FIELD OF THE INVENTION

The present invention relates to the field of illumination design technology, and particularly relates to a light guide and a lighting device with parallel light source.

BACKGROUND OF THE INVENTION

With the development of science and technology and the improvement of people's living quality requirements, requirement on the variety of lighting products becomes higher and higher. How to manufacture a lighting device meeting the requirements of people is the greatest concern of each enterprise related to lighting industry.

In secondary optical design, collimation design has been most studied by those skilled in the art, that is, divergent ray of light emitted from a point light source is converted into a parallel light beam or an approximately parallel light beam by a light guide which is designed correspondingly, so as to improve directivity and uniformity of the ray of light emitted from the light source.

However, only a parallel light source is arranged in a lighting device with parallel light source in the prior art, thus the shape of the light-emitting surface of the lighting device with parallel light source is simple and user's requirement on the variety of the lighting effect of the lighting device with parallel light source cannot be satisfied.

SUMMARY OF THE INVENTION

The present invention provides a light guide and a lighting device with parallel light source having the light guide, the light guide is capable of enabling rays of light emitted from light-emitting surfaces of the lighting device with parallel light source to form a certain pattern, thus improving the variety of the lighting effect of the lighting device with parallel light source.

In order to achieve the above purpose, the present invention provides a technical solution as follows.

A light guide of a lighting device with parallel light source comprises a body with a light incident side and a light emergent side, wherein the body comprises:

a light incident surface, which is a surface of the body at the light incident side, and exactly faces a light emergent surface of a parallel light source so as to guide parallel rays of light emitted from the parallel light source into the body;

light emergent surfaces, which are surfaces of the body at the light emergent side, and are used for guiding the parallel rays of light in the body out of the body; and a light guide surface group, which is provided with a plurality of light guide surfaces and is used for guiding at least a part of the parallel rays of light guided into the body via the light incident surface by total reflection through interaction of the plurality of the light guide surfaces, and the plurality of the light guide surfaces interact with the light emergent surfaces to determine out-emitting positions of the rays of light guided by total reflection by the light guide surface group, on the light emergent surfaces, so that the body is formed with bright areas with guided-out rays of light and dark areas without guided-out rays of light on the light emergent surfaces.

In the above light guide, the light incident surface, as a surface of the body at the light incident side, exactly faces the light emergent surface of the parallel light source included in the lighting device with parallel light source, therefore, the parallel rays of light emitted from the parallel light source may be guided into the light guide in a direction perpendicular to the light incident surface of the light guide, then at least a part of the rays of light guided into the body via the light incident surface of the light guide is totally reflected by the light guide surface group arranged on the body, the out-emitting positions of the part of the rays of light guided by reflection by the light guide surface group, on the light emergent surfaces are finally determined through the interaction of the light guide surface group and the light emergent surfaces of the body, and thus the body is formed with bright areas with guided-out rays of light and dark areas without guided-out rays of light on the light emergent surfaces. The distribution of the bright areas and the dark areas of the body on the surfaces of the light emergent side may form a certain pattern.

Therefore, the above light guide provided by the present invention is capable of enabling the light rays emitted from the light-emitting surface of the lighting device with parallel light source to form a certain pattern, thus improving the variety of the lighting effect of the lighting device with parallel light source.

Preferably, an outer contour of a projection of the body on a plane where the light incident surface is located is circular, and an axis line of the body is perpendicular to the light incident surface.

Preferably, the body is provided with one annular plane parallel to the light incident surface at the light emergent side to form one light emergent surface, and the plurality of light guide surfaces in the light guide surface group comprise:

at least one conical surface whose opening is located at the light emergent side and whose axis line is perpendicular to a plane where the light emergent surface is located, wherein in a direction from the light incident side points to the light emergent side, a diameter of each of the conical surfaces is linearly increased, and an axis line of each of the conical surfaces passes through circle centres of the light emergent surfaces; and a plurality of reflecting faces each of which is formed at the light incident side of the body and provided with a reflecting surface facing a reflecting surface of the conical surface, wherein gaps exist among projections of the plurality of reflecting surfaces on the plane where the light incident surface is located;

wherein after parallel rays of light emitted from the parallel light source enter into the body through the light incident surface, at least a part of the parallel rays of light emitted from the parallel light source irradiate on the conical surfaces, then emitted towards the plurality of reflecting faces after being totally reflected on the conical surfaces, and the rays of light irradiating on any of the plurality of reflecting faces are emitted towards the light emergent surfaces after being totally reflected by the reflecting face, and emitted out of the body through the light emergent surfaces so as to form one of the bright areas.

Preferably, each of the plurality of reflecting faces is an annular inclined surface, which is formed at the light incident side of the body, and has an axis line coinciding with the axis line of the conical surface so as to reflect the rays of light reflected by the conical surface to the light emergent surfaces.

Preferably, the body further comprises at least one annular groove whose opening is located at the light emergent side of the body and whose axis line coincides with the axis line of the conical surface, a lateral surface of each of the annular grooves forms one of the annular inclined surfaces, and in a radially outward direction of the annular groove, a depth of each of the at least one annular groove in a direction parallel to the axis line of the conical surface is gradually increased.

Preferably, the body further comprises, at the light incident side, a plurality of step rings whose axis lines coincide with the axis lines of the conical surfaces, respectively, and a lateral surface of each of the plurality of step rings forms one of the annular inclined surfaces.

Preferably, the body further comprises a plurality of grooves whose openings are located at the light emergent side, a sidewall of each of the plurality of grooves forms one of the reflecting faces, and a contour of a projection of the sidewall forming the reflecting face, of each of the plurality of grooves on the plane where the light incident surface is located is in a fan shape whose circle centre is located on the axis line of the body.

Preferably, the body is further provided with a plurality of annular planes parallel to the light incident surface at the light emergent side, and each of the plurality of annular planes forms one light emergent surface; and the plurality of light guide surfaces in the light guide surface group comprise:

at least one conical surface whose opening is located at the light emergent side of the body and whose axis line is perpendicular to the plane where the light emergent surfaces are located, wherein in a direction from the light incident side to the light emergent side, a diameter of each of the conical surfaces is linearly increased, and an axis line of each of the conical surfaces passes through the circle centres of the light emergent surfaces;

a plurality of first reflecting faces formed at the light emergent side of the body;

a plurality of second reflecting faces formed at the light incident side of the body and provided with reflecting surfaces which are in one-to-one correspondence with the reflecting surfaces of the first reflecting surfaces; and a plurality of third reflecting faces formed at the light incident side of the body, gaps existing among projections of the plurality of third reflecting faces on the plane where the light incident surface is located, wherein at least a part of the plurality of third reflecting faces are in one-to-one correspondence with the plurality of second reflecting faces, wherein the parallel rays of light emitted by the parallel light source irradiate on the conical surfaces after entering into the body through the light incident surface, then totally reflected on the conical surfaces, at least a part of the rays of light totally reflected by the conical surfaces are emitted towards the plurality of first reflecting faces, each of which totally reflects the rays of light irradiating thereon to a corresponding second reflecting face of the plurality of second reflecting faces, the corresponding second reflecting face totally reflects the rays of light irradiating thereon to a corresponding third reflecting face the corresponding third reflecting face totally reflects the rays of light irradiating thereon to a corresponding annular plane, and the rays of light irradiating on the corresponding annular plane are emitted out of the body through the corresponding annular plane so as to form one of the bright areas.

Preferably, each of the plurality of first reflecting faces is an annular inclined surface whose axis line coincides with the axis lines of the conical surfaces;

each of the plurality of second reflecting faces is an annular inclined surface whose axis line coincides with the axis lines of the conical surfaces; and each of the plurality of third reflecting faces is an annular inclined surface whose axis line coincides with the axis lines of the conical surfaces, and the plurality of third reflecting faces are in one-to-one correspondence with the plurality of annular planes on the light emergent surfaces.

Preferably, projections of the plurality of third reflecting faces on the plane where the light incident surface is located are concentric.

Preferably, the light guide is a light guide made from polymethyl methacrylate or a light guide made from polycarbonate, and an included angle between any one of the light guide surfaces in the light guide surface group and the light incident surface is 45 degrees.

Preferably, the light guide further comprise groove whose opening is located at the light emergent side of the body:

the groove is a conical groove, and a sidewall of the groove forms one of the conical surfaces whose diameters are linearly increased in a direction from the light incident side to the light emergent side; or the groove is a step groove, and a sidewall of the groove comprises a plurality of conical surfaces and a plurality of annular planes parallel to the light incident surface to form a plurality of light emergent surfaces.

Another aspect of the present invention further provides a lighting device with parallel light source, comprising a parallel light source and the light guide provided by any one of the above technical solutions, the parallel light source is located at the light incident side of the light guide, and the light emergent surfaces of the parallel light source exactly faces the light incident surface of the light guide.

Preferably, when the outer contour of the projection of the body of the light guide on the plane where the light incident surface is located is circular, and the axis line of the body is perpendicular to the light incident surface, the light emergent surface of the parallel light source is circular, and the circle centre of the light emergent surface is located on the axis line of the light guide.

BRIEF DESCRIPTION OF THE DRAWINGS

FIG. 1b is a schematic diagram illustrating bright areas and dark areas formed, by the structure of the light guide, at a light emergent side of the light guide, during the light emitting of the light guide shown in FIG. 1a;

FIG. 4b is a schematic diagram illustrating bright areas and dark areas formed, by the structure of the light guide, at the light emergent side of the light guide, during the light emitting of the light guide shown in FIG. 4a;

DETAILED DESCRIPTION OF THE EMBODIMENTS

Technical solutions in embodiments of the present invention will be clearly and completely described below in conjunction with the accompanying drawings. Apparently, the embodiments to be described are only a part but not all of the embodiments of the present invention. All other embodiments that are obtained, based upon the embodiments in the present invention, by those skilled in the art without creative efforts fall within the protection scope of the present invention.

Figure 1A:
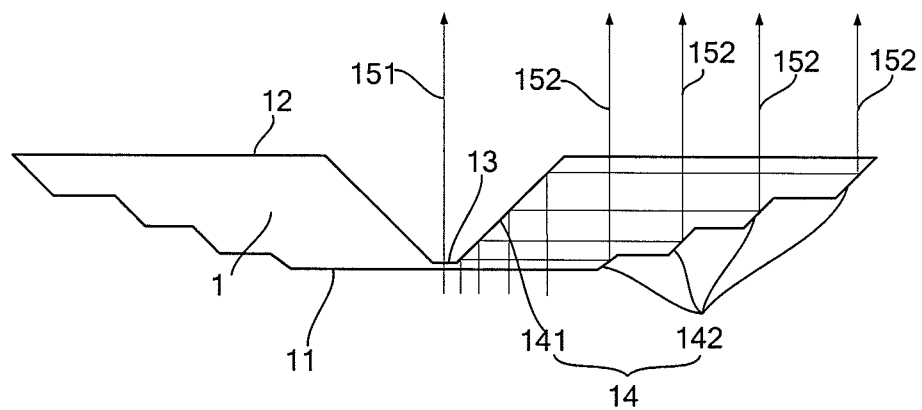
FIG. 1a is a schematic diagram of a structure of a light guide provided by an embodiment of the present invention.
Figure 1B:
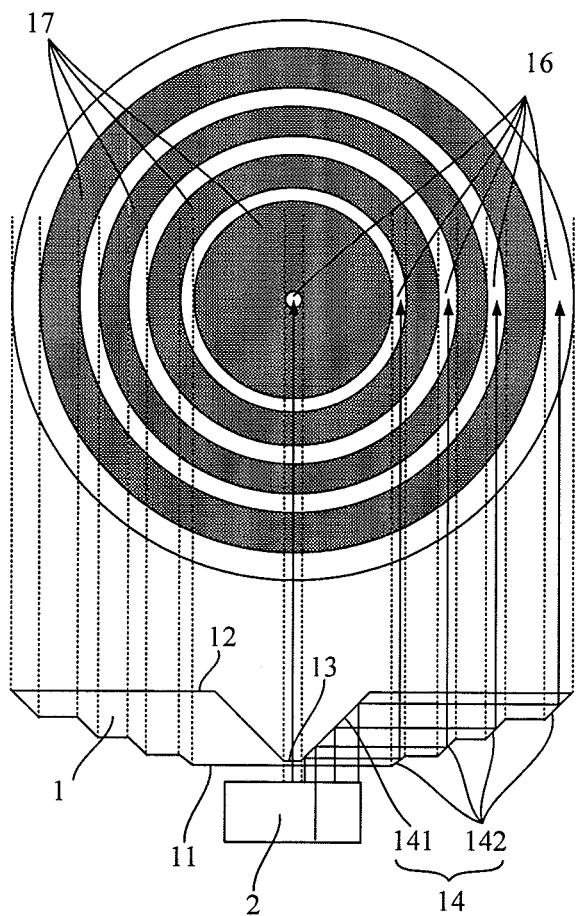

Referring to FIGS. 1a and 1b, the present invention provides a light guide and a lighting device with parallel light source having the light guide, the lighting device with parallel light source comprises a parallel light source 2 located at a light incident side of the light guide, a light emergent surface of the parallel light source 2 exactly faces a light incident surface 11 arranged on a body 1 of the light guide, and the above lighting device with parallel light source enables rays of light emitted from a light-emitting surfaces of the lighting device with parallel light source to form a certain pattern through the above light guide, thus increasing the variety of the lighting effect of the lighting device with parallel light source.

Specifically, still referring to FIGS. 1a and 1b, the light guide of the lighting device with parallel light source provided by the embodiments of the present invention comprises a body 1 with a light incident side and a light emergent side, and the body 1 comprises:

a light incident surface 11, which is a surface of the body 1 at the light incident side, and exactly faces the light emergent surface of the parallel light source 2 so as to guide parallel rays of light emitted from the parallel light source 2 into the body 1;

light emergent surfaces, which are surfaces of the body 1 at the light emergent side, and are used for guiding the parallel rays of light in the body 1 out of the body 1, such as a light emergent surface 12 and a light emergent surface 13 shown in FIG. 1a; and a light guide surface group 14, which is provided with a plurality of light guide surfaces and is used for guiding at least a part of the parallel rays of light guided into the body 1 via the light incident surface 11 by total reflection by virtue of interaction of the plurality of the light guide surfaces, and the plurality of light guide surfaces interacts with the light emergent surfaces to determine out-emitting positions, on the light emergent surfaces 12 and 13, of the rays of light guided by the light guide surface group 14 by total reflection, thus the body 1 is formed with bright areas with guided-out rays of light and dark areas without guided-out rays of light on the light emergent surfaces, such as bright areas 16 and dark areas 17 shown in FIG. 1b.

In the above light guide, the light incident surface 11, as the surface of the body 1 at the light incident side, exactly faces the light emergent surface of the parallel light source 2, therefore, the parallel rays of light emitted from the light emergent surface of the parallel light source 2 may be emitted into the body 1 of the light guide in a direction perpendicular to the light incident surface 11 of the light guide, then at least a part of the rays of light guided into the body 1 via the light incident surface 11 of the light guide is totally reflected by the light guide surface group 14 provided on the body 1, the out-emitting positions, on the light emergent surfaces of the body 1, of the part of the rays of light guided by the light guide surface group 14 by reflection are finally determined by virtue of interaction of the light guide surface group 14 and the body 1, and then the body 1 is formed with bright areas 16 with guided-out rays of light and dark areas 17 without guided-out rays of light on the light emergent surfaces 12 and 13. Distribution of the bright areas 16 and the dark areas 17 on the light emergent surfaces of the body 1 may form a certain pattern.

Therefore, the above light guide provided by the present invention is capable of enabling the rays of light emitted from the light-emitting surface of the lighting device with parallel light source to form a certain pattern, thus improving the variety of the lighting effect of the lighting device with parallel light source.

In a preferable embodiment, an outer contour of a projection of the body 1 on a plane where the light incident surface 11 is located is circular, and an axis line of the body 1 is perpendicular to the light incident surface 11.

The light emergent surfaces and the light guide surface group of the light guide provided in the above specific embodiment may be provided in various modes, and two modes are described below.

Figure 3:
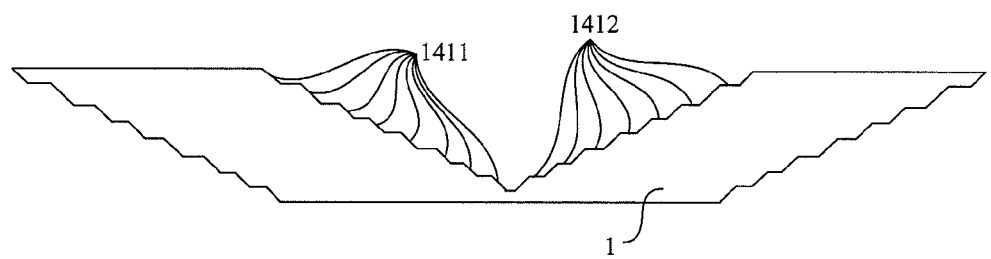
FIG. 3 is a schematic diagram of a structure of a light guide provided by a still another embodiment of the present invention.

First, a first mode is described. Referring to FIGS. 1a, 1b and 3, a surface of the light emergent side of the body 1 is an annular plane parallel to the light incident surface 11 so as to form one light emergent surface 12. The plurality of light guide surfaces in the light guide surface group 14 specifically comprise:

at least one conical surface whose opening is located at the light emergent side of the body 1 and whose axis line is perpendicular to a plane where the light emergent surface 12 is located, wherein a diameter of each of the conical surfaces is linearly increased in a direction from the light incident side to the light emergent side, and an axis line of each conical surface passes through circle centres of the light emergent surfaces 12;

a plurality of reflecting faces each of which is formed at the light incident side of the body 1 and provided with a reflecting surface facing a reflecting surface of the conical surface, wherein gaps exist among projections of the reflecting faces on the plane where the light incident surface 11 is located;

Here, after parallel rays of light emitted from the parallel light source 2 enter into the body 1 through the light incident surface 11, at least a part of the parallel rays of light irradiate on the conical surfaces, then emitted to the plurality of reflecting surfaces after being totally reflected on the reflecting surfaces of the conical surfaces, and the rays of light irradiating on any of the plurality of reflecting faces 142 are emitted towards the light emergent surface 12 after being totally reflected by the reflecting surface of the reflecting face 142, and emitted out of the body 1 through the light emergent surface so as to form one bright area 16.

Taking the structure of the light guide shown in FIG. 1a as an example, a sidewall of a groove only forms one conical surface 141, and a bottom surface of the groove forms one light emergent surface 13. As shown in FIG. 1b, the parallel rays of light emitted from the parallel light source 2 enter into the body 1 in a direction perpendicular to the light incident surface 11, wherein a part of the rays of light 151 are directly emitted out of the body 1 through the light emergent surface 13, and the other part of the rays of light 152 irradiate on the conical surface 141 and are totally reflected on the conical surface 141; the body 1 forms a plurality of reflecting faces 142 at the light incident side, and the rays of light irradiating on each of the reflecting faces 142 are reflected to a corresponding out-emitting position on the light emergent surface 12 so as to form the bright area 16.

On the basis of the first mode, each of the reflecting faces 142 may be an annular inclined surface formed at the light incident side of the body 1 and with an axis line coinciding with the axis line of the conical surface so as to reflect the rays of light reflected by the conical surface to the light emergent surface 12.

Figure 2:
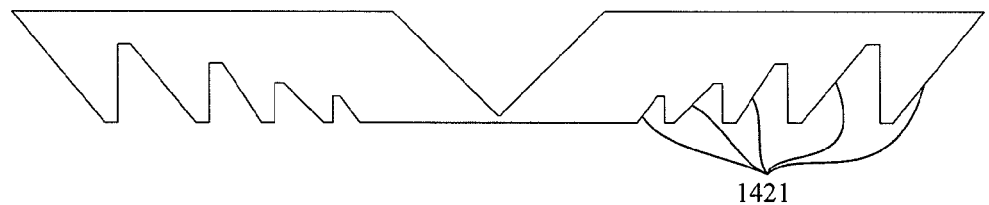
FIG. 2 is a schematic diagram of a structure of a light guide provided by another embodiment of the present invention.

Preferably, as shown in FIG. 2, the body 1 is provided with at least one annular groove whose opening is located at the light emergent side of the body and whose axis line coincides with the axis line of the conical surface, one lateral surface 1421 of each of the annular grooves forms one of the above annular inclined surfaces, and in a radially outward direction of the annular grooves, a depth of each of the annular grooves in a direction parallel to the axis line of the conical surface is gradually increased.

Preferably, as shown in FIG. 1a, the body 1 is provided with a plurality of step rings whose axis lines coincide with the axis line of the conical surface, respectively, a lateral surface of each of the plurality of step rings forms one annular inclined surface, and each annular inclined surface is a reflecting face 142.

Figure 6A:
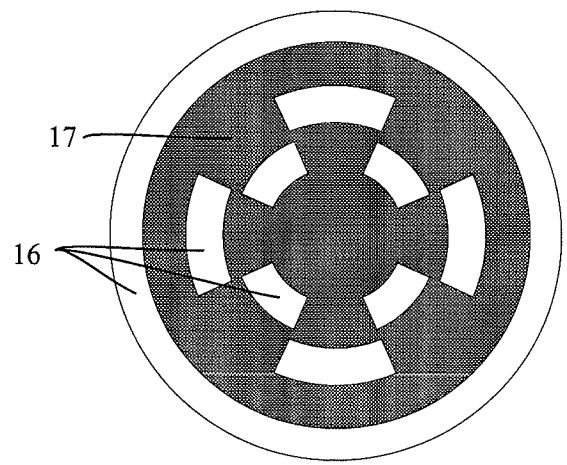
FIG. 6a is a schematic diagram illustrating a distribution pattern of bright areas and dark areas formed at a light emergent side by the light guide provided by the embodiments of the present invention.

Another preferable embodiment is as shown in FIG. 6a. FIG. 6a is a schematic diagram of a distribution pattern of bright areas and dark areas formed at a light emergent side by a light guide provided by an embodiment of the present invention. The distribution pattern of the bright areas 16 and the dark areas 17 shown in FIG. 6a may be obtained through setting the positions and shapes of the reflecting faces 142 on the body 1.

Specifically, the light guide may have a structure as follows.

Figure 6B:
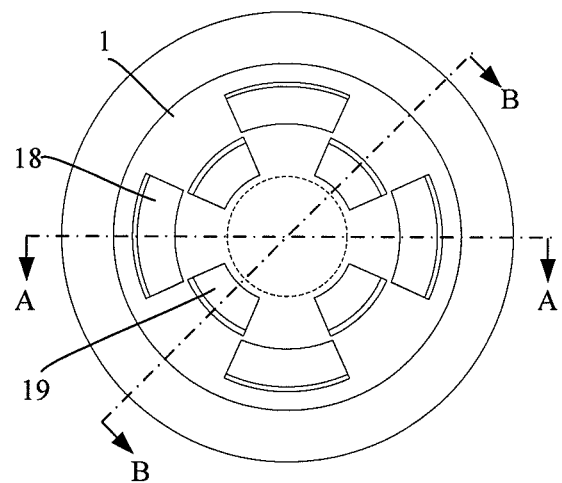
FIG. 6b is a schematic diagram of a structure of the light guide forming the pattern shown in FIG. 6a, at a light incident side provided by an embodiment of the present invention.
Figure 6C:
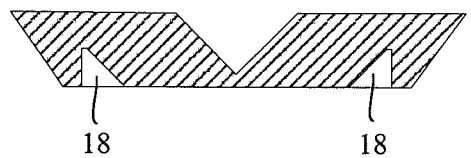
FIG. 6c is a sectional view of the structure shown in FIG. 6b along a line A-A in FIG. 6b.
Figure 6D:
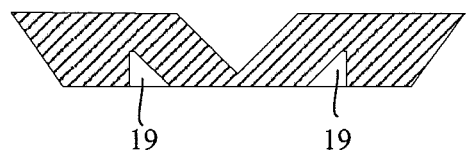
FIG. 6d is a sectional view of the structure shown in FIG. 6b along a line B-B in FIG. 6b.

As shown in FIGS. 6b, 6c and 6d, FIG. 6b is a schematic diagram of a structure of the light guide forming the pattern shown in FIG. 6a at the light incident side provided by one embodiment of the present invention; FIG. 6c is a sectional view of the structure shown in FIG. 6b along line A-A in FIG. 6b; FIG. 6d is a sectional view of the structure shown in FIG. 6b along line B-B in FIG. 6b. The body 1 is provided with a plurality of grooves whose openings are located at the light emergent side, such as a groove 18 and a groove 19. As shown in FIG. 6c, one sidewall of the groove 18 forms one of the reflecting faces; as shown in FIG. 6d, one sidewall of the groove 19 forms one of the reflecting faces; and contours of projections of the reflecting face formed by the groove 18 and the reflecting face formed by the groove 19 on the plane where the light incident surface 11 is located are of a fan shape whose circle centre is on the axis line of the body 1.

Figure 6E:
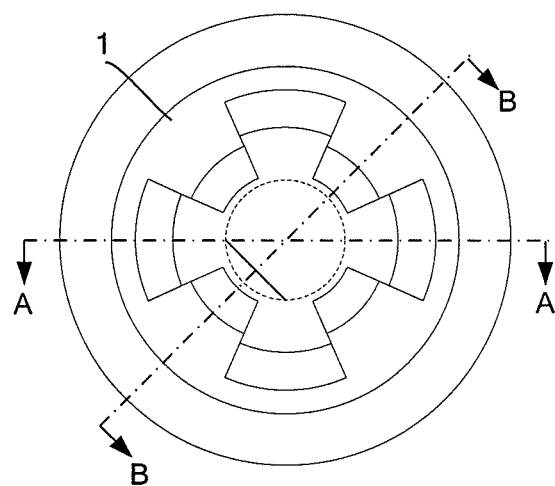
FIG. 6e is a schematic diagram of the light guide forming the pattern shown in FIG. 6a, at a light incident side provided by another embodiment of the present invention.
Figure 6F:
FIG. 6f is a sectional view of the structure shown in FIG. 6e along line A-A in FIG. 6e.
Figure 6G:
FIG. 6g is a sectional view of the structure shown in FIG. 6e along line B-B in FIG. 6e.

In addition, the light guide may also be provided with grooves as shown in FIGS. 6e, 6f and 6g at the light incident side of the body 1, so as to form corresponding reflecting faces 142. Here, FIG. 6e is a schematic diagram of a structure of the light guide forming the pattern shown in FIG. 6a, at the light incident side provided by another embodiment of the present invention; FIG. 6f is a sectional view of the structure shown in FIG. 6e along line A-A in FIG. 6e; and FIG. 6g is a sectional view of the structure shown in FIG. 6e along line B-B in FIG. 6e.

Figure 4A:
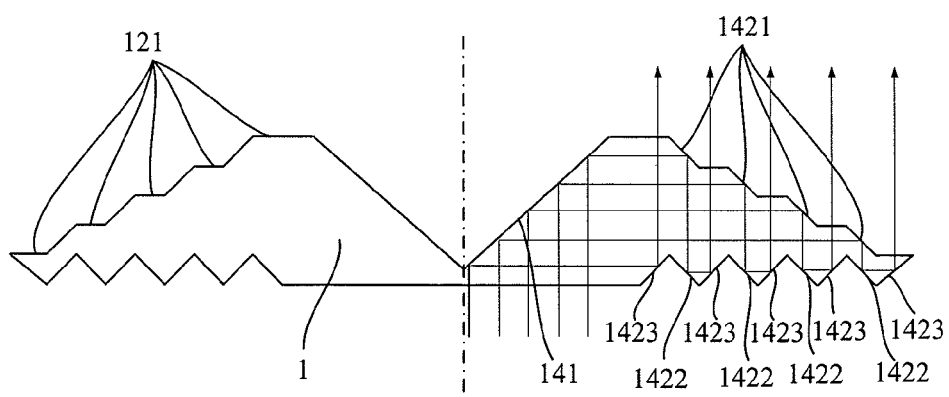
FIG. 4a is a schematic diagram of a structure of a light guide provided by another embodiment of the present invention.
Figure 4B:
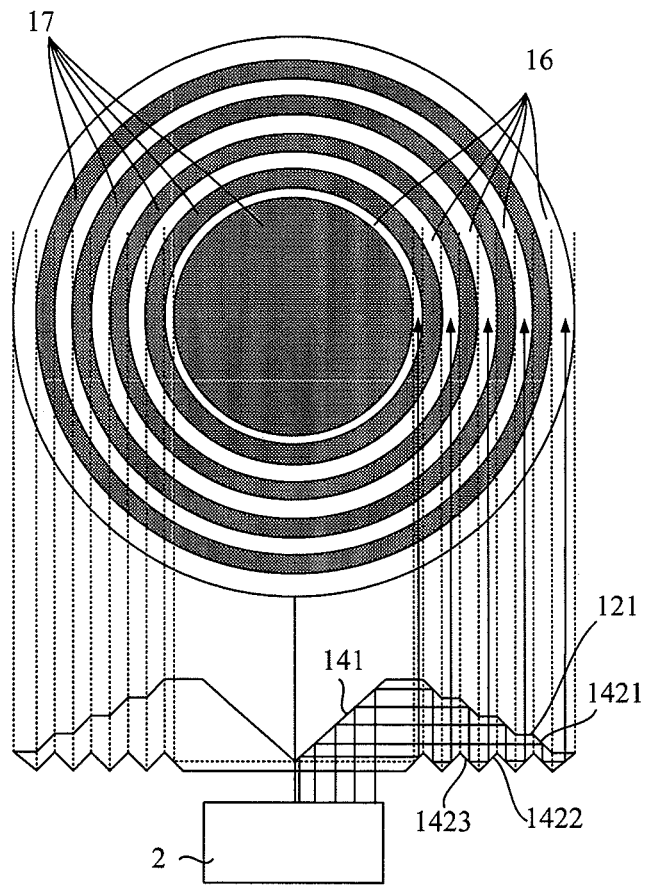

The second mode will be described next. Referring to FIGS. 4a and 4b, the body 1 is provided with a plurality of annular planes 121 parallel to the light incident surface 11 at the light emergent side, and each of the annular planes 121 forms one light emergent surface; and a plurality of light guide surfaces in the light guide surface group 14 specifically comprise:

at least one conical surface 141 whose opening is located at the light emergent side of the body 1 and whose axis line is perpendicular to the plane where the light emergent surface is located, wherein, a diameter of each of the conical surfaces 141 is linearly increased in a direction from the light incident side to the light emergent side, and the axis line of each of the conical surfaces 141 passes through the circle centres of the light emergent surfaces;

a plurality of first reflecting faces 1421 formed at the light emergent side of the body 1;

a plurality of second reflecting faces 1422 formed at the light incident side of the body 1 and provided with reflecting surfaces which are in one-to-one correspondence with the reflecting surfaces of the first reflecting faces 1421; and a plurality of third reflecting faces 1423 formed at the light incident side of the body 1, gaps existing among projections of the plurality of third reflecting faces 1423 on the plane where the light incident surface 11 is located, wherein at least a part of the plurality of third reflecting faces 1423 are in one-to-one correspondence with the plurality of second reflecting faces 1422.

Here, as shown in FIG. 4b, parallel rays of light emitted from the parallel light source 2 irradiate on the conical surfaces 141 after entering into the body 1 through the light incident surface 11 (see FIG. 1b), and are totally reflected on the conical surface 141, at least a part of the rays of light totally reflected by the conical surfaces 141 are emitted towards the plurality of first reflecting faces 1421, each of which totally reflects the rays of light irradiating thereon to the corresponding second reflecting face 1422, each reflecting face 1422 totally reflects the rays of light irradiating thereon d to the corresponding third reflecting face 1423, each third reflecting face 1423 totally reflects the rays of light irradiating thereon to the corresponding annular plane 121, and the rays of light irradiating on the corresponding annular plane 121 are emitted out of the body 1 through the corresponding annular plane 121 so as to form one of the bright areas 16.

In the second mode, as shown in FIG. 4a, each of the plurality of first reflecting faces 1421 is an annular inclined surface whose axis line coincides with the axis line of the conical surface 141;

each of the plurality of second reflecting faces 1422 is an annular inclined surface whose axis line coincides with the axis lines of the conical surfaces 141; and each of the plurality of third reflecting faces 1423 is an annular inclined surface whose axis line coincides with the axis lines of the conical surfaces 141, and the plurality of third reflecting faces 1423 are in one-to-one correspondence with the plurality of annular planes 121 on the light emergent surfaces.

In a preferable embodiment, the projections of the plurality of third reflecting faces 1423 on the plane where the light incident surface 11 is located are concentric.

Preferably, the light guide provided by each of the above embodiments is a light guide made from polymethyl methacrylate (PMMA) or a light guide made from polycarbonate (PC), and an included angle between any one of the light guide surfaces in the light guide surface group 14 and the light incident surface 11 is 45 degrees.

Figure 5:
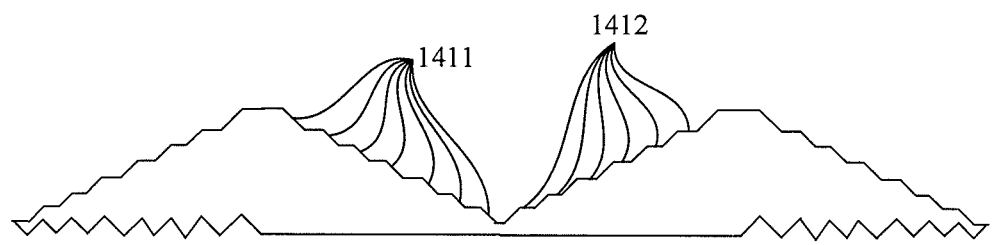
FIG. 5 is a schematic diagram of a structure of a light guide provided by still another embodiment of the present invention.

In a preferable embodiment on the basis of the above first mode and second mode, the opening of the body 1 is located in a groove at the light emergent side:

as shown in FIGS. 1a, 2, 4a, 6c and 6f, the groove is a conical groove, the sidewall of the groove forms a conical surface whose diameter is linearly increased in a direction from the light incident side to the light emergent side; or as shown in FIGS. 3 and 5, the groove is a step groove, and the sidewall of the groove comprises a plurality of conical surfaces 1411 and a plurality of annular planes 1412 parallel to the light incident surface 11 to form the light emergent surfaces.

Another aspect of the present invention further provides a lighting device with parallel light source. The lighting device with parallel light source comprises a parallel light source, and the light guide provided by any of the above technical solutions. The parallel light source is located at the light incident side of the light guide, and the light emergent surface of the parallel light source exactly faces the light incident surface of the light guide.

Preferably, when the outer contour of the projection of the body of the light guide on the plane where the light incident surface is located is circular, and the axis line of the body is perpendicular to the light incident surface, the light emergent surface of the parallel light source is circular, and the circle centre of the light emergent surface is located on the axis line of the light guide.

Obviously, a person skilled in the art can make various modifications and variations to the embodiments of the present invention without departing from the spirit and scope of the present invention. These modifications and variations are also fall within the protection scope of the present invention.

The invention claimed is:

1. A light guide of a lighting device with parallel light source configured to emit rays of light, comprising a body with a light incident side and a light emergent side, the body comprising:

a light incident surface, which is a surface of the body at the light incident side, and exactly faces a light emergent surface of a parallel light source so as to guide the rays of light emitted from the parallel light source into the body, the light incident surface and the light emergent surface of the parallel light source are both perpendicular to an optical axis of the body, the rays of light emitted from the parallel light source are all emitted parallel to the optical axis;

light emergent surfaces, which are surfaces of the body at the light emergent side, and are used for guiding the rays of light in the body out of the body; and a light guide surface group, which is provided with a plurality of light guide surfaces and is used for guiding at least a part of the rays of light guided into the body via the light incident surface by total internal reflection through interaction of the plurality of light guide surfaces, and the plurality of light guide surfaces interact with the light emergent surfaces to determine out-emitting positions of the rays of light guided by total internal reflection by the light guide surface group, on the light emergent surfaces, so that the body is formed with bright areas with guided-out rays of light and dark areas without guided-out rays of light on the light emergent surfaces, one of the bright areas being on the optical axis.

2. The light guide according to claim 1, wherein an outer contour of a projection of the body on a plane where the light incident surface is located is circular.

3. The light guide according to claim 2, wherein the body is provided with one annular plane parallel to the light incident surface at the light emergent side to form one light emergent surface, and the plurality of light guide surfaces in the light guide surface group comprise:

at least one conical surface whose opening is located at the light emergent side and whose axis line is perpendicular to a plane where the light emergent surface is located, wherein in a direction from the light incident side to the light emergent side, a diameter of each of the conical surfaces is linearly increased, and an axis line of each of the conical surfaces passes through circle centers of the light emergent surfaces; and a plurality of reflecting faces each of which is formed at the light incident side of the body and provided with a reflecting surface facing a reflecting surface of the conical surface, wherein gaps exist among projections of the plurality of reflecting surfaces on the plane where the light incident surface is located;

wherein, after the rays of light emitted from the parallel light source enter into the body through the light incident surface, at least a part of the rays of light emitted from the parallel light source irradiate on the conical surfaces, then emitted towards the plurality of reflecting faces after being totally internally reflected on the conical surfaces, and the rays of light irradiating on any of the plurality of reflecting faces are emitted towards the light emergent surfaces after being totally internally reflected by the reflecting face, and emitted out of the body through the light emergent surfaces so as to form one of the bright areas.

4. The light guide according to claim 3, wherein each of the plurality of reflecting faces is an annular inclined surface, which is formed at the light incident side of the body, and has an axis line coinciding with the axis line of the conical surface so as to reflect the rays of light reflected by the conical surface to the light emergent surfaces.

5. The light guide according to claim 4, wherein the body further comprises at least one annular groove whose opening is located at the light emergent side of the body and whose axis line coincides with the axis line of the conical surface, a lateral surface of each of the annular grooves forms one of the annular inclined surfaces, and in a radially outward direction of the annular groove, a depth of each of the at least one annular groove in a direction parallel to the axis line of the conical surface is gradually increased.

6. The light guide according to claim 4, wherein the body further comprises, at the light incident side, a plurality of step rings whose axis lines coincide with the axis lines of the conical surfaces, respectively, and a lateral surface of each of the plurality of step rings forms one of the annular inclined surfaces.

7. The light guide according to claim 3, wherein the body further comprises a plurality of grooves whose openings are located at the light emergent side, a sidewall of each of the plurality of grooves forms one of the reflecting faces, and a contour of a projection of the sidewall forming the reflecting face, of each of the plurality of grooves on the plane where the light incident surface is located is in a fan shape whose circle center is located on the optical axis of the body.

8. The light guide according to claim 2, wherein the body is further provided with a plurality of annular planes parallel to the light incident surface at the light emergent side, and each of the plurality of annular planes forms one light emergent surface, and the plurality of light guide surfaces in the light guide surface group comprise:
- at least one conical surface whose opening is located at the light emergent side of the body and whose axis line is perpendicular to the plane where the light emergent surfaces are located, wherein in a direction from the light incident side to the light emergent side, a diameter of each of the conical surfaces is linearly increased, and an axis line of each of the conical surfaces passes through the circle centers of the light emergent surfaces;
- a plurality of first reflecting faces formed at the light emergent side of the body;
- a plurality of second reflecting faces formed at the light incident side of the body and provided with reflecting surfaces which are in one-to-one correspondence with the reflecting surfaces of the first reflecting surfaces; and
- a plurality of third reflecting faces formed at the light incident side of the body, gaps existing among projections of the plurality of third reflecting faces on the plane where the light incident surface is located, wherein at least a part of the plurality of third reflecting faces are in one-to-one correspondence with the plurality of second reflecting faces,
- wherein the rays of light emitted by the parallel light source irradiate on the conical surfaces after entering into the body through the light incident surface, then totally internally reflected on the conical surfaces, at least a part of the rays of light totally internally reflected by the conical surfaces are emitted towards the plurality of first reflecting faces, each of which totally internally reflects the rays of light irradiating thereon to a corresponding second reflecting face of the plurality of second reflecting faces, the corresponding second reflecting face totally internally reflects the rays of light irradiating thereon to a corresponding third reflecting face, the corresponding third reflecting face totally paternally reflects the rays of light irradiating thereon to a corresponding annular plane, and the rays of light irradiating on the corresponding annular plane are emitted out of the body through the corresponding annular plane so as to form one of the bright areas.

9. The light guide according to claim 8, wherein each of the plurality of first reflecting faces is an annular inclined surface whose axis line coincides with the axis lines of the conical surfaces;
- each of the plurality of second reflecting faces is an annular inclined surface whose axis line coincides with the axis lines of the conical surfaces; and
- each of the plurality of third reflecting faces is an annular inclined surface whose axis line coincides with the axis lines of the conical surfaces, and the plurality of third reflecting faces are in one-to-one correspondence with the plurality of annular planes on the light emergent surfaces.

10. The light guide according to claim 9, wherein projections of the plurality of third reflecting faces on the plane where the light incident surface is located are concentric.

11. The light guide according to claim 1, wherein the light guide is a light guide made from polymethyl methacrylate or a light guide made from polycarbonate, and an included angle between any one of the light guide surfaces in the light guide surface group and the light incident surface is 45 degrees.

12. The light guide according to claim 3, further comprising a groove whose opening is located at the light emergent side of the body, wherein,
- the groove is a conical groove, and a sidewall of the groove forms one of the conical surfaces whose diameters are linearly increased in a direction from the light incident side to the light emergent side; or
- the groove is a step groove, and a sidewall of the groove comprises a plurality of conical surfaces and a plurality of annular planes parallel to the light incident surface to form a plurality of light emergent surfaces.

13. The light guide according to claim 4, further comprising a groove whose opening is located at the light emergent side of the body, wherein,
- the groove is a conical groove, and a sidewall of the groove forms one of the conical surfaces whose diameters are linearly increased in a direction from the light incident side to the light emergent side; or
- the groove is a step groove, and a sidewall of the groove comprises a plurality of conical surfaces and a plurality of annular planes parallel to the light incident surface to form a plurality of light emergent surfaces.

14. The light guide according to claim 5, further comprising a groove whose opening is located at the light emergent side of the body, wherein,
- the groove is a conical groove, and a sidewall of the groove forms one of the conical surfaces whose diameters are linearly increased in a direction from the light incident side to the light emergent side; or
- the groove is a step groove, and a sidewall of the groove comprises a plurality of conical surfaces and a plurality of annular planes parallel to the light incident surface to form a plurality of light emergent surfaces.

15. The light guide according to claim 6, further comprising a groove whose opening is located at the light emergent side of the body, wherein,
- the groove is a conical groove, and a sidewall of the groove forms one of the conical surfaces whose diameters are linearly increased in a direction from the light incident side to the light emergent side; or
- the groove is a step groove, and a sidewall of the groove comprises a plurality of conical surfaces and a plurality of annular planes parallel to the light incident surface to form a plurality of light emergent surfaces.

16. The light guide according to claim 7, further comprising a groove whose opening is located at the light emergent side of the body, wherein,
- the groove is a conical groove, and a sidewall of the groove forms one of the conical surfaces whose diameters are linearly increased in a direction from the light incident side to the light emergent side; or
- the groove is a step groove, and a sidewall of the groove comprises a plurality of conical surfaces and a plurality of annular planes parallel to the light incident surface to form a plurality of light emergent surfaces.

17. The light guide according to claim 8, further comprising a groove whose opening is located at the light emergent side of the body, wherein
- the groove is a conical groove, and a sidewall of the groove forms one of the conical surfaces whose diameters are linearly increased in a direction from the light incident side to the light emergent side; or
- the groove is a step groove, and a sidewall of the groove comprises a plurality of conical surfaces and a plurality of annular planes parallel to the light incident surface to form a plurality of light emergent surfaces.

18. The light guide according to claim 9, further comprising a groove whose opening is located at the light emergent side of the body, wherein,
- the groove is a conical groove, and a sidewall of the groove forms one of the conical surfaces whose diameters are linearly increased in a direction from the light incident side to the light emergent side; or
- the groove is a step groove, and a sidewall of the groove comprises a plurality of conical surfaces and a plurality of annular planes parallel to the light incident surface to form a plurality of light emergent surfaces.

19. A lighting device with parallel light source, comprising a parallel light source, wherein the lighting device with parallel light source further comprises the light guide according to claim 1, the parallel light source is located at the light incident side of the light guide, and the light emergent surfaces of the parallel light source exactly faces the light incident surface of the light guide.

20. The lighting device with parallel light source according to claim 19, wherein when the outer contour of the projection of the body of the light guide on the plane where the light incident surface is located is circular the light emergent surface of the parallel light source is circular, and the circle center of the light emergent surface is located on the optical axis.

* * * * *